June 26, 1962 S. H. DENGLE 3,040,414
SCARFING AND TRIMMING MACHINE
Filed Aug. 3, 1959 3 Sheets-Sheet 1

INVENTOR:
Sydney H. Dengle,
BY Bair, Freeman & Molinare
ATTORNEYS.

June 26, 1962  S. H. DENGLE  3,040,414
SCARFING AND TRIMMING MACHINE
Filed Aug. 3, 1959  3 Sheets-Sheet 3

INVENTOR:
Sydney H. Dengle,
BY Bair, Freeman & Molinare
ATTORNEYS.

United States Patent Office 3,040,414
Patented June 26, 1962

3,040,414
SCARFING AND TRIMMING MACHINE
Sydney H. Dengle, Des Moines, Iowa, assignor to Meredith Publishing Company, Des Moines, Iowa, a corporation of Iowa
Filed Aug. 3, 1959, Ser. No. 831,295
3 Claims. (Cl. 29—21)

This invention relates to a machine for trimming and scarfing curved printing plates. The machine is designed to mill tension-type lock-up pockets on the concave side of the plate and simultaneously to trim the straight edges of the plate adjacent the milled portions.

One object of the invention is to provide a simple and reliable mechanism for accurately trimming the plates while milling a plurality of accurately spaced pockets in the underside thereof, thereby producing a plate that will register to close tolerances when secured to the printing cylinder.

Another object is to provide an improved plate clamping apparatus for securing the printing plate to the supporting saddle.

Another object is to provide an improved means for guiding the milling cutter which means is capable of producing any number of pockets cut to any desired depth.

The invention will best be understood by reference to the accompanying drawings, in which.

Figure 1:
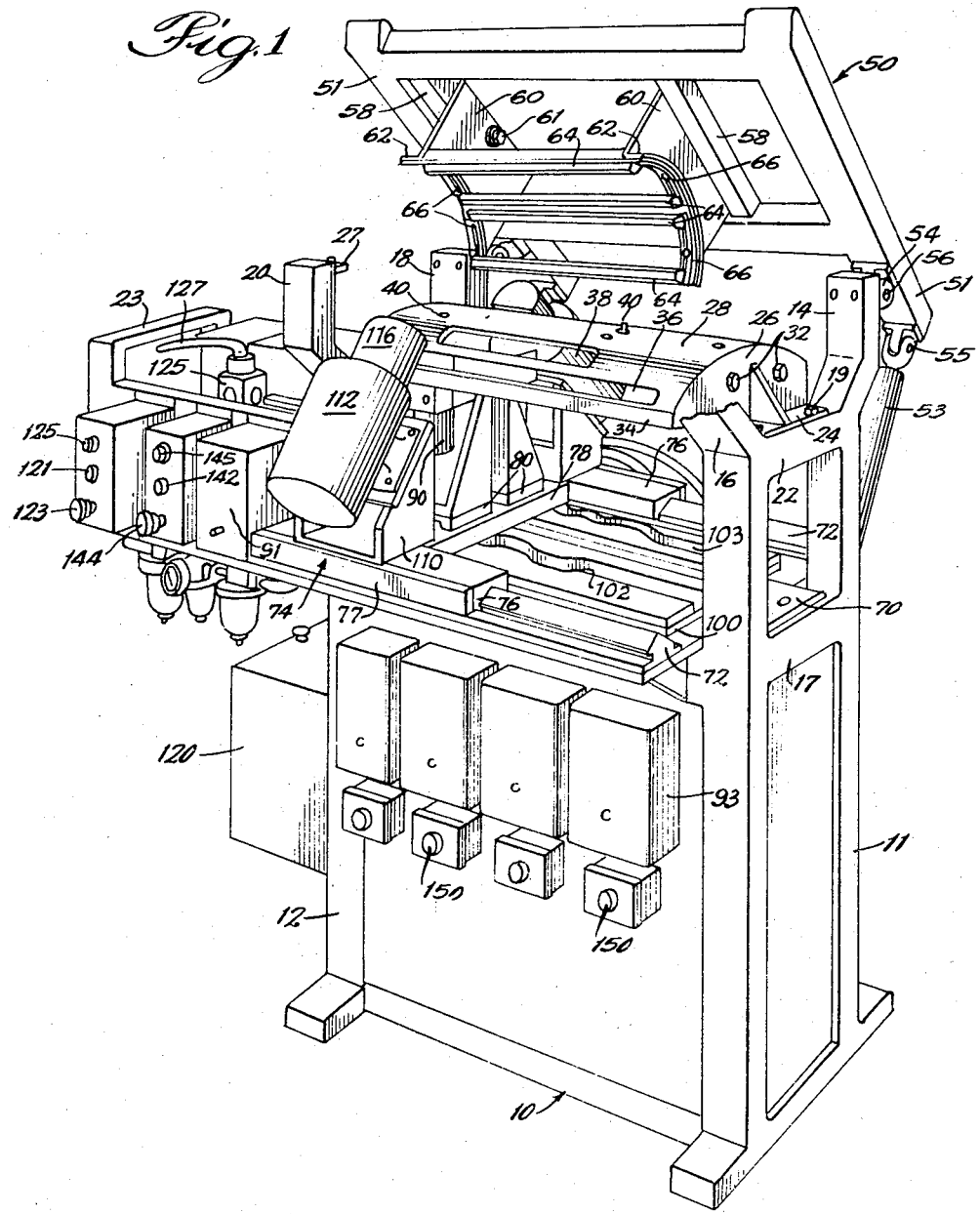
FIGURE 1 is a perspective view of a trimming and scarfing machine constructed in accordance with the invention.

Generally, the machine consists of a saddle 28 on which the curved plate is placed and locked by means of the yoke 50. Locating pins 40 cooperate with complementary holes previously drilled in the underside of the plate to locate the printed matter on the plate accurately with respect to the saddle. A pair of milling cutters 92 are disposed on the concave side of the plate and are adapted to cut notches or pockets in that side through openings 38 adjacent the straight edge of the plate. A pair of saw blades are disposed on the convex side of the plate to trim the straight edges of the plates through openings 36 in the saddle. Both pairs of blades are driven by motors mounted on the carriage 74 which runs along the axis of the saddle. The cutting blades 92 are mounted on individual carriages which move laterally with respect to the main carriage 74 to permit moving the cutter toward and away from the plate, as well as axially thereof.

One of the novel features of the invention is the cam plate for guiding lateral movements of cutters 92. The carriages 80 on which the milling cutters 92 and the motors driving them are mounted move laterally on the cross member 78 comprising part of the carriage 74. The cam plate 100 is supported by the bed 70. A cam follower secured to each of said carriages rides in the cam track 102 or 103 and thus controls lateral movement of the cutters 92 and the depth and length of the pockets cut in the plate.

Figure 2:
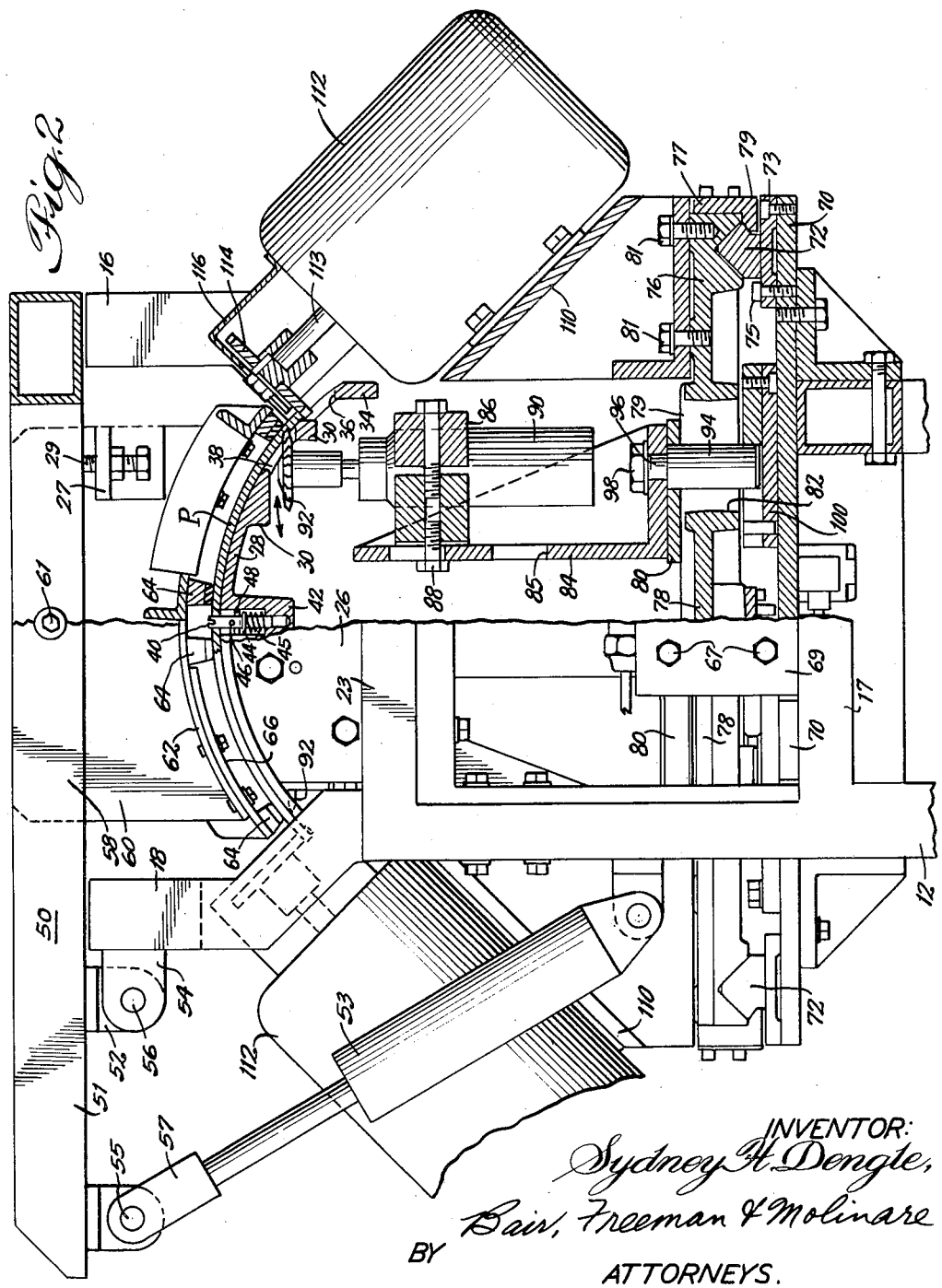
FIGURE 2 is an end elevation, with the yoke closed against the saddle and with the frame legs broken away, looking toward the left end of FIGURE 1, half of which is in section.

Coming now to the details, the machine comprises a frame 10 having a pair of spaced upright members 11 and 12 which support the bed 70 and terminate at their upper ends in vertical arms 14, 16, 18 and 20. The rearward arms 14 and 18 pivotally support the yoke 50 and the forward arms 16, 20 carry stops as described below. Brackets 24 are secured by bolts 19 to the cross pieces 22 comprising part of the frame of the machine. Welded to the brackets 24 are a pair of heads 26 having a curved supporting edge which serves to support the saddle 28. The saddle is formed integrally with a reinforcing frame 30 extending longitudinally between the heads 26, as best shown in FIGURE 2. Bolts 32 extend through the heads 26 into the ends of the saddle. The saddle presents an arcuate surface having the exact curvature of the surface of the printing cylinder and terminates at its edges in straight bar members 34. Immediately adjacent each of the bars 34 an opening 36 is provided extending substantially along the entire length of the saddle. The openings 36 are provided to admit the saw blade 114 for trimming the straight edge of the plate. Spaced upwardly further from the edge is a second pair of elongated openings 38 spaced equidistant from the ends of the saddle for providing access to the concave side of the plate for milling the pockets therein.

In order to accurately locate the plate on the saddle I have provided a plurality of locating pins 40 which are adapted to recess below the surface of the saddle 28 when not in use. A plurality of sets of pins is provided to accommodate different sized plates. Two or three pins are usually used for each plate to insure accurate location. The plates are previously registered and locating holes are drilled in the concave side thereof, precisely placed with respect to the printed matter on the plate. The drilled holes match with the pins 40. As shown in FIGURE 2, pin 40 is mounted in a well 42 integrally formed with the saddle 28. The pin carries a collar 44 fixed thereto and a spring 45 is disposed around the pin beneath the collar, normally urging the pin upwardly. The bottom of the spring bears against the shoulder spaced from the bottom of the well. Flange 48 (split ring) projecting inwardly from the wall of the well has a pair of slots cut diametrically opposite each other which permit pin 46 extending transversely of the pin 40 to move past the flange when aligned with the slots. Thus, the pin 40 may be recessed by pushing it down into the well against the force of spring 45 with the pin 46 aligned with the slots. The pin 40 is then turned through an angle of 90° and the pin 46 is locked beneath the flange 48 to hold the pin in the recessed position.

The yoke 50 comprises a generally rectangular frame having a pair of transverse parallel arms 51 which extend rearwardly beyond the frame proper. Connected to the underside of each of the arms 51 is a tongue member 52 which is adapted to fit in the clevis 54 secured to the backside of the uprights 14, 18. A pin 56 secures the parts together and permits the yoke 50 to pivot about the axis of the pins. The downward movement of the yoke 50 is arrested by stops 27 mounted on the arms 16, 20. The stops carry a bolt 29 for adjustability. Cross members 58 comprising part of the yoke frame extending parallel to the arms 51 provide support means for suspending the hold-down bars 64. This is accomplished by means of suspension plates 60 which are bolted by means of bolts 61 to the cross members 58. Each of the plates 60 terminates at its lower end in a right angle flange 62 which is arcuate in shape. The hold-down bars 64 are secured to the underside of the flange 62 by means of clamps 66 bolted to the flange. The hold-down bars 64 are preferably covered with a resilient material such as rubber to provide a good grip on the plate and to prevent damaging the surface of the plate under the pressure imposed.

The means for actuating the yoke 50 constitutes a pair of hydraulically operated cylinders 53 which are pivotally secured at their lower ends to the frame of the machine and at their upper ends to a pivot pin 55 beneath the arms 51. When the piston rods in the cylinders 53 are extended, the yoke descends on the saddle and the hold-down bars apply pressure over the surface of the plate to lock it securely to the saddle while the trimming and milling takes place. The hold-down bars 64 are spaced so as to accommodate the openings 36 and 38 through the saddle.

The bed 70 is supported by cross members 17 comprising part of the frame and extends beyond the left end of the frame for some distance to support a cylinder for actuating the carriages and the controls for the machine. Mounted on either side of the bed 70 and extending longitudinally thereof are ways or tracks 72. The tracks support a carriage 74 comprising rail members 76 and an integral web 78 extending therebetween. The rails 76 have a groove in the underside thereof which complements the triangular configuration of the track 72 to permit the carriage to slide freely along the tracks. The web portion 78 is spaced above the bed 70, as best shown in FIGURE 2. The carriage 74 supports the saw cutters 114 and a pair of milling cutters 92 and permits moving these tools along the axis of the saddle 28. The milling cutters are mounted on separate additional carriages 80 which move laterally across the main carriage 74 like a cross feed carriage on a lathe. Carriages 80 have a central groove in the bottom which fits on a transverse track 79 projecting above the surface of the web 78. The carriage 74 is locked to the tracks 72 by means of plates 77 secured along the sides thereof. The plates 77 have a flange 79 along the bottom thereof which fits beneath a shoulder under the outer edge of the track 72, as best shown in FIGURE 2.

The saw means for trimming the straight edges of the plate comprises a motor 112 mounted on a bracket 110 which in turn is secured to the carriage 74 by means of bolts 81. The motor 112 has a conventional shaft to which the circular trimming blade 114 is affixed. The trimming blade is enclosed in a shroud 116 to prevent the operator from accidentally contacting it and to confine the cutting chips. It will be understood, of course, that there are two saws of this kind, one mounted on either side of the carriage so that both straight edges of the printing plate P can be trimmed simultaneously. The axis of the motor shaft 113 is tangent to the line along which the plate is to be trimmed. Consequently, the bracket 110 is designed to tilt the motor and blade at the appropriate angle. It is desirable, of course, to trim the plate so that the cut edge is normal to the surface, that is, on a radius of a circle defining the curvature of the plate. The blades 114 are of suitable diameter to extend down into openings 36 in the saddle.

A bracket 84 is secured to each cross-carriage 80 and serves to support the motor 90 which drives the mill cutter 92. The motor is fixed to the bracket 84 by means of a clamp 86 and a bolt 88. The opening 85 in the bracket is provided to permit making connections to the motor. It will be understood, of course, that there are two structures of this kind, each for cutting pockets in opposite sides of the plate P mounted on the saddle. The motor 90 is mounted in a vertical position and the teeth of the cutter are shaped to form a pocket of the desired configuration in the underside of the plate. The edge of the cutters extend through the openings 38 in the saddle.

Figure 4:
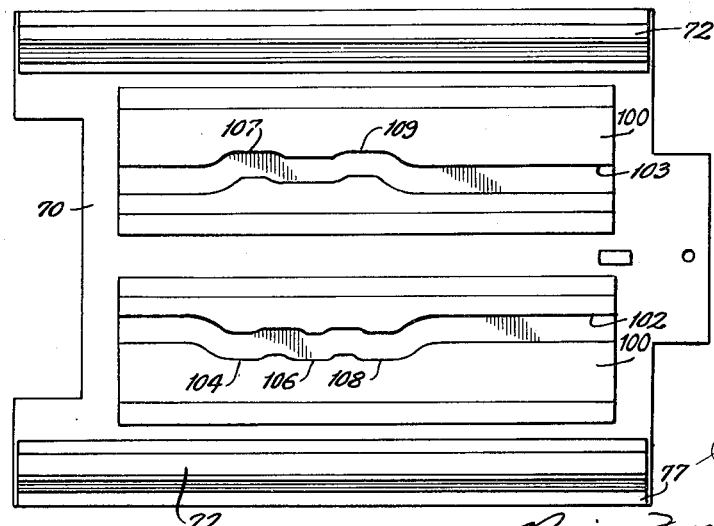
FIGURE 4 is a plan view of the bed, carriage ways and cam plate for supporting and guiding the cutters.

In order to control the movement of the mill cutters toward and away from the concave surface of the plate P, I have provided cam plates 100 removably secured to the bed 70 of the machine by means of cap screws. The cam plates contain cam tracks 102, 103 running longitudinally of the plate. A cam follower 94, rotatably mounted on a vertical shaft 96, is secured to the carriage 80 by means of a nut 98 which bolts onto the shaft over the bracket 84, as best shown in FIGURE 2. The lower part of the cam follower 94 rides in the cam tracks 102 or 103 and as the direction of the track changes, the carriage 80 is moved laterally to bring the cutter 92 into and out of engagement with the concave side of the plate. The cam plate is best illustrated in FIGURE 4. It will be noted that the shape of the cam track 102 is designed to bring the cutter into engagement with the plate at three separate points by reason of the curved surfaces 104, 106, 108. Cam track 103 has two points of curvature 107, 109 which are separated from each other the distance desired between the pockets to be cut in the plate. It will be understood that the depth of the pockets and the number of pockets may be controlled by the shape of the cam track.

The cam plate 100 can be removed from the bed and replaced with another plate having tracks of a different configuration when desired.

It will be understood that the carriage 74 moves longitudinally of the bed and carries with it the outer saws 114 as well as the laterally movable inner cutters 92. The carriage 74 preferably is advanced and retracted by means of a hydraulic cylinder 71 which is shown schematically in FIGURE 3, and connects to the left end of the carriage. The left end of the cylinder 71 is secured to the upright plate 69 shown in the left-hand side of FIGURE 2 by means of bolts 67. The cylinder is supported by the cantilevered portion of the bed 70 which extends to the left of the frame proper.

Figure 3:
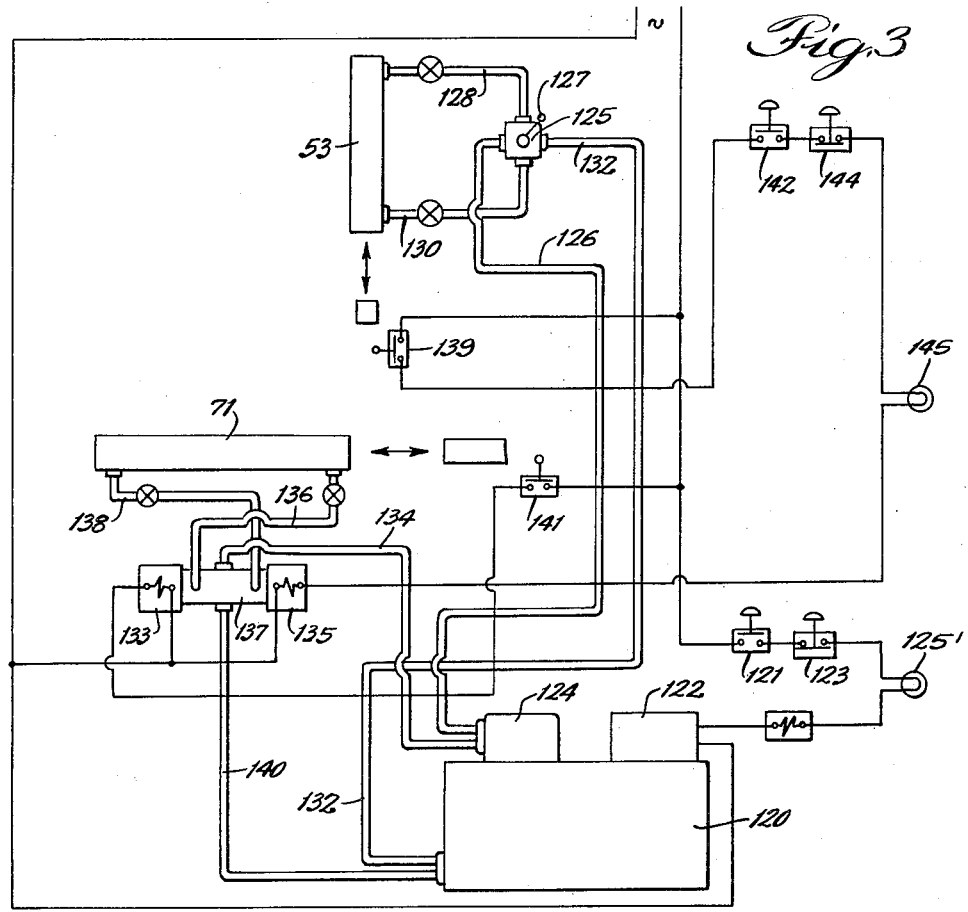
FIGURE 3 is a schematic representation of the power and control system for the machine.

The operation of the device will best be understood by reference to FIGURE 3 which shows the control system for the machine. In trimming and scarfing a plate, the plate is first laid on the saddle with the locating pins 40 disposed within the cooperating depressions which have been previously formed during registration in the underside of the plate. The valve 125 having a handle 127 is then manually actuated to admit hydraulic fluid to the lower ends of cylinders 53, thus rotating the yoke 50 and causing it to clamp the plate securely against the saddle. Hydraulic fluid is supplied from a conventional power pack unit 120 having a motor 122 and a pump 124 for supplying the pressure. Hydraulic fluid to the cylinder 53 comes from the line 126. (When the valve handle 127 is moved in the opposite direction, the valve directs fluid into the top of the cylinder 53 and releases fluid from the lower end, thus permitting the yoke to move upwardly out of contact with the saddle.) The switch 121 controls the operation of the motor 122 and, of course, must be on before the machine will operate. The indicator light 125' on the control panel will be on when the motor of the hydraulic system is operating.

After the yoke has clamped the plate, the next operation is to move the carriage 74 longitudinally of the bed on the ways 72. This is done by closing the switch 142 on the control panel which in turn actuates the solenoid 135. It will be noted that limit switch 139 is in series with switch 142. A finger (not shown) on the rod of one of the cylinders 53 closes switch 139 only when the yoke is down. Thus, the carriage 74 will not move unless the plate is clamped securely to the saddle. Solenoid 135 operates the valve 137 to admit pressurized hydraulic fluid from the line 134 into the line 138 which is connected to the outer end of the cylinder 71. The valve port connecting to line 136 is also opened so that when the piston in the cylinder advances to the right, the fluid forced out of the cylinder is free to flow back through the valve into the line 140 and the reservoir of pack unit 120. Indicator light 145 is on when the switch 144 is closed. As the carriage 74 moves longitudinally of the machine under the influence of cylinder 71, the saws 114 trim the straight edges of the plate P mounted on the saddle. The inner cutters 92 form the pockets as dictated by the design of the cam tracks 102, 103. The undulations in the cam tracks cause the carriages 80 to move laterally as the main carriage 74 moves longitudinally, thus bringing the cutting heads 92 into and out of engagement with the concave side of the plate. When the carriage 74 reaches the right end of the machine, a finger (not shown) on the piston rod of cylinder 71 strikes a limit switch 141. This closes the circuit to the solenoid 133 which reverses the valve 137 so that the hydraulic pressure is to the right end of the cylinder and the discharge is from the left end through line 138. Thus, the direction of movement of the carriage is reversed, the hydraulic cylinder pulling the carriage back to the original position as shown in FIGURE 2.

The motors 112 and 90 which rotate the cutter blades are controlled by switch 91. The boxes 93 mounted on the front of the machine are the starters for the motors. Signal lights 150 indicate when the motors are running.

It will be noted that two additional switches 123 and 144 are shown in the diagram, FIGURE 3, and on the control panel, FIGURE 1. These are emergency switches and are equipped with large-headed actuators so that the operator can shut off the current to the hydraulic system and/or to the solenoids in case of emergency.

It will be appreciated that other sources of power and different control means may be employed without departing from the basic concept of the invention. For example, air motors and pneumatic cylinders may be used. Other modifications will occur to those skilled in the art and it is my intention to include all such modifications that may reasonably be construed to come within the scope of the appended claims.

What I claim as new and desire to secure by Letters Patent of the United States is:

1. A machine for simultaneously trimming and scarfing curved printing plates comprising a frame having a bed, a saddle mounted on the frame above the bed, a yoke movably secured to said frame for engaging a printing plate mounted on said saddle, means for actuating said yoke to move it into and out of contact with said saddle, a pair of tracks mounted on top of said bed extending longitudinally thereof below said saddle, a primary carriage adapted to slide on said tracks above the bed, a pair of secondary carriages mounted on said primary carriage for movement laterally with respect to the direction of movement of said primary carriage, a motor mounted on each of said pair of secondary carriages having a shaft projecting upwardly toward the underside of the saddle, a cutting blade mounted on said shaft, a pair of trimming blades and motors therefor mounted on said primary carriage laterally outside said saddle and accurately positioned with respect to said saddle, a cam plate mounted on said bed containing cam slots accurately positioned with respect to said saddle, a cam follower secured to each of said secondary carriages and adapted to run in said cam slots to effect lateral movement of said scarfing cutters as the primary carriage moves on said tracks, and means for reciprocating said primary carriage on said tracks.

2. The machine of claim 1 which includes hold-down bars suspended from said yoke, having a cushioned surface to bear against said printing plate.

3. The machine of claim 2 which includes a pair of stops mounted on said frame for limiting the travel of said yoke toward said printing plate.

References Cited in the file of this patent

UNITED STATES PATENTS

| | | |
|---|---|---|
| 405,662 | Cummings et al. | June 18, 1889 |
| 471,601 | Clause | Mar. 29, 1892 |
| 2,085,908 | Huck | July 6, 1937 |
| 2,604,017 | Crafts et al. | July 22, 1952 |
| 2,736,947 | Faeber | Mar. 6, 1956 |
| 2,928,161 | Krueger | Mar. 15, 1960 |